2,978,366
FILM REMOVAL METHOD

Stephen H. Harwig, Pittsburgh, and Dwight W. Barkley, New Kensington, Pa., assignors to Libbey-Owens-Ford Glass Company, Toledo, Ohio, a corporation of Ohio No Drawing. Filed Nov. 12, 1957, Ser. No. 695,506

7 Claims. (Cl. 134—3)

The present invention relates broadly to transparent electrically conducting metal films, and more particularly to a method for removing such films or selected portions thereof from surfaces to which they have been applied. Now transparent, electrically conducting films of metals such as gold are now quite widely known and have been used in connection with the production of de-icing windows and windshields of aircraft. Such films and filmed articles are described in detail in the patent to William H. Colbert, Arthur R. Weinrich and Willard L. Morgan, No. 2,628,927, and are characterized by their high degree of transparency and comparatively high electrical conductivity.

In the fabrication of articles having such transparent electrically conducting metal films, it is often desirable to remove either a portion of or the entire electrically conducting film. Generally, the entire film is removed when the film which has been applied does not meet the required specifications and removal thereof is important to preserve the glass sheet or article so that it may be recovered for refilming.

However, such films are characterized by being tightly adherent to the glass or silica ceramic surface so that removal such as by abrasive means would damage the optical properties of the glass and thereby not serve the desired purpose. Also, the application of strong chemicals such as aqua regia also have the disadvantage of adversely affecting the optical properties of the glass. Further, strong chemicals have the disadvantage of being difficult and dangerous to handle.

Accordingly, it is a primary object of this invention to provide a method of removing electrically conducting metal films of the character described without impairing the optical properties of the surface on which they have been applied.

Another object of this invention is to provide a simple, inexpensive method of removing all or part of electrically conducting metal films of the character described to allow refilming with the desired electrically conducting film.

It has now been found that such films may be removed by comparatively mild solutions which are preferably dilute solution of a mild oxidizing material. For example, it is found that cupric ions in a dilute acid solution are sufficiently active to remove the electrically conducting film, and yet mild enough to prevent injury to the glass surface.

It is found that solutions of iodine and iodine salts provide another effective solution for removing films of the above character. With the iodine solution, it is believed that a sufficient amount of acid is formed by the reaction of iodine and water to provide the desired acidity and that the iodine provides the desired oxidation.

It is not known exactly how these solutions operate to remove the electrically conducting film, but it is believed that the weak acid character reacts with the thin metal oxide adhesive layer to remove the adhesive coating from the metal film and that the weak oxidizing agent is effective to penetrate the gold film because of its extremely thin character. Also these solutions are effective in spite of the use of a protective quartz or silica coating as the upper layer of the electrically conducting film and again it is believed that these solutions may be effective because of the extremely thin layer of such films. As evidence of the fact that the sealer layer may be attacked by such solutions, it is found that sometimes comparatively large areas of coating are removed as a film. However, these solutions do penetrate through the silica and gold layers in spite of the rather mild chemical action and the known resistance of such materials as gold and quartz.

The following examples of treating solutions are given by way of illustration only, and it is to be understood that other solutions may be used in the practice of this invention:

*Example I*

A solution was made up which composed 10 grams of potassium iodide, 10 grams of iodine and about 100 ml. of water. The solution is heated to about 150° F., and the glass sheet or article is immersed therein in order to strip the electrically conducting film from the surface thereof. After the film has been removed, the glass sheet or article is rinsed in warm water to remove the stripping solution and dried.

*Example II*

A solution was prepared by mixing together 2 pounds of cupric chloride, 2 gallons of hydrochloric acid (20° Bé.=sp. gr. 1.16) and 3 gallons of water. The solution is heated to a temperature of about 130 to 180° F. and the coated glass article is immersed therein for a time sufficient to remove the electrically conducting metal coating. After removal, the glass article is rinsed in warm water and dried.

The above solutions have proven to be effective in removal of gold, aluminum, chromium, iron, nickel and monel films, and dichroic films composed of alternate layers of magnesium fluoride and titanium dioxide deposited either underneath or on top of the electrically conducting coating. Films produced from the oxides of iron, chromium, aluminum and silica have likewise been removed by these solutions. Careful inspection of the optical properties of the glass indicates that these properties of the glass are substantially the same as they were prior to the application of the electrically conducting coating. Accordingly, it is seen that solutions of the above character are effective in removing defective coatings in order to recover valuable glass articles.

It is also contemplated that specified areas of the electrically conducting film may be isolated and removed by the above described solutions in order to provide removal of selected portions of the electrically conducting coating.

It is to be understood that the form of the invention disclosed herein is to be taken as the preferred embodiment thereof, and that various procedural changes may be resorted to without departing from the spirit of the invention or the scope of the following claims.

We claim:

1. A method of removing transparent electrically conducting metal films from transparent glass windows without impairing the optical properties of the glass windows, comprising immersing the transparent glass windows in an acidic hydrohalide solution containing a salt from the group consisting of potassium iodide and cupric chloride.

2. A method of removing transparent electrically conducting metal films from transparent glass windows as claimed in claim 1, wherein the solution contains dilute hydrochloric acid.

3. A method of removing transparent electrically conducting metal films from transparent glass windows as claimed in claim 1, wherein the solution contains iodine.

4. A method of removing transparent electrically conducting metal films from transparent glass articles as claimed in claim 1, wherein the solution consists of substantially 10 grams of potassium iodide, 10 grams of iodine, and 100 cubic centimeters of water.

5. A method of removing transparent electrically conducting metal films from transparent glass windows as claimed in claim 1, wherein the solution consists of substantially 2 pounds of cupric chloride in solution with 2 gallons of hydrochloric acid and 3 gallons of water.

6. A method of reclaiming selected areas of the surfaces of glass windows having a coating of gold, aluminum, chromium, iron, nickel or monel thereon, comprising treating the area in a bath of cupric chloride, hydrochloric acid and water, rinsing the area with water, and drying the area.

7. A method of reclaiming a glass window having a dichroic film of alternate layers of magnesium fluoride and titanium dioxide thereon, comprising immersing the window in a bath of cupric chloride, hydrochloric acid and water, rinsing the window with water, and drying the window.

References Cited in the file of this patent
UNITED STATES PATENTS

| | | |
|---|---|---|
| 2,291,202 | Bassett | July 28, 1942 |
| 2,382,317 | Hoff | Aug. 14, 1945 |
| 2,536,075 | MacNutt | Jan. 2, 1951 |
| 2,572,576 | Stybel | Oct. 23, 1951 |
| 2,637,669 | Brown | May 5, 1953 |
| 2,726,180 | Stankey | Dec. 6, 1955 |
| 2,850,409 | Boicey et al. | Sept. 2, 1958 |